Jan. 8, 1946.  F. SCHAEFER  2,392,771
BRAKE LEVER FOR RAILWAY CAR BRAKE RIGGING
Filed May 10, 1945
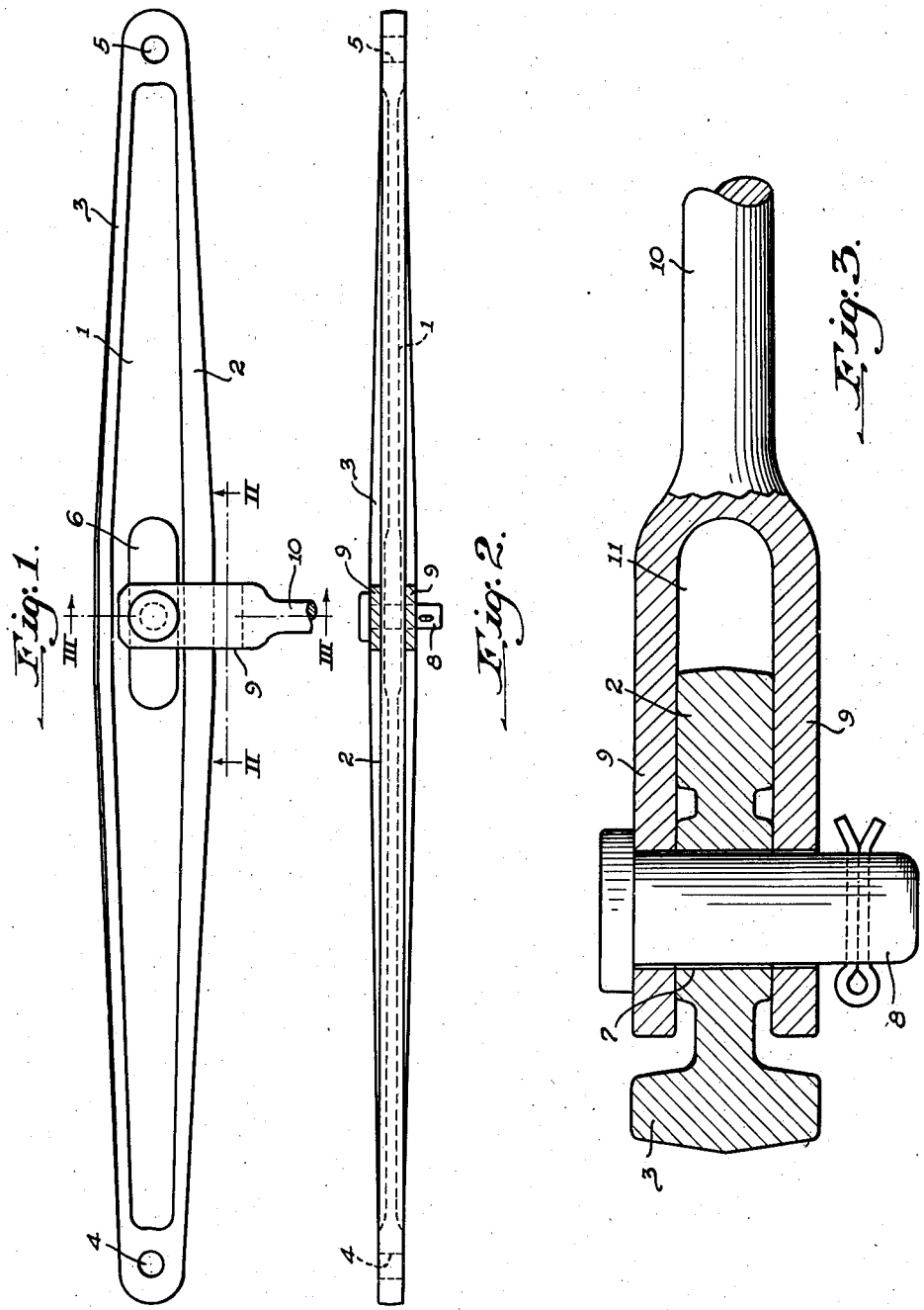
WITNESSES:
E. J. Maloney
E. O. Johns
INVENTOR
FREDERIC SCHAEFER.
BY
Brown, Critchlow & Flick
his ATTORNEYS.

Patented Jan. 8, 1946

2,392,771

UNITED STATES PATENT OFFICE 2,392,771

BRAKE LEVER FOR RAILWAY CAR BRAKE RIGGING

Frederic Schaefer, Pittsburgh, Pa.

Application May 10, 1945, Serial No. 593,036

3 Claims. (Cl. 74—519)

The invention relates to railway car brake riggings, and has particularly to do with forged brake levers for such riggings having a web and flanges at the edges of the web forged integrally with it.

In such riggings some levers are connected directly to the brake beams, while others may be connected in the rigging between the beams and the actuated means. Both types of levers are contemplated by this invention, but it will be described as a brake lever pivotally connected at one end to a brake beam and at its other end to either a truck bracket or a brake rod, while intermediate of its ends it is pivotally connected to a bifurcated end of a connecting rod. The axes of the several pivotal connections to the lever are perpendicular to its web so that braking forces applied to the lever act in the plane of its web and sometimes buckle the lever.

The object of the invention is to provide railway car brake riggings with brake levers of the integrally forged type having materially increased strength to resist buckling when braking forces are applied.

The invention is illustrated in the accompanying drawing, of which Fig. 1 is a plan view of a brake lever embodying the invention connected to the bifurcated end of a connecting rod; Fig. 2 a side view of the brake lever, the connection of it to a connecting rod being a sectional view taken on the line II—II of Fig. 1; and Fig. 3 a transverse sectional view taken on the line III—III of Fig. 1.

The brake lever shown in the drawing has a web 1 and flanges 2 and 3 at its edges. The ends of the lever, which are materially thicker than its web, are provided with holes 4 and 5, the hole 4 being for pivotally connecting the lever to a truck bracket or rod, and the hole 5 for pivotally connecting the lever to a brake beam. Intermediate of its ends the lever has a thickened boss 6 which is provided with a hole 7 to receive a pin 8 for connecting the lever to fork arms 9 that form the bifurcated end of a connecting rod 10.

As customarily made, both flanges of forged brake levers are of equal width and depth, and each lever is so positioned within the slot formed by the bifurcated ends of a connecting rod that the entire width of the lever may lie within the slot, the depth of both flanges being sufficiently less than the width of the slot to permit the lever easily to be placed in the slot.

According to this invention, a brake lever is so positioned within the slotted end of a connecting rod that one of its flanges lies beyond the end of the rod, and such flange has a materially greater depth than the width of the slot. As shown in the drawing, the flange 3 of the brake lever lies beyond the end of connecting rod 10, and is of materially greater depth than the slot 11 formed between the arms 9 that constitute the bifurcated end of the rod. By thus positioning the brake lever in the connecting rod and providing it with a deep flange beyond the end of the rod, the brake lever is materially strengthened to resist buckling when braking forces are applied to it in the plane of the web of the lever.

As shown particularly in Fig. 2, flange 3 tapers in depth from the intermediate pin hole 7 of the lever to the end pin holes 4 and 5, the flange being deepest adjacent to pin hole 7 where the greatest strength is required to resist buckling of the lever, and as seen in Fig. 1, such flange is of substantially uniform width throughout. As also seen in Fig. 1, flange 2, which is of uniform depth throughout, tapers in width from its widest portion adjacent to pin hole 7 to the ends of the lever. Due to this disposition of metal throughout the flanges, the lever may readily be forged from a flat slab-like blank.

According to the provisions of the patent statutes I have explained the principle of my invention and have illustrated and described what I now consider to be its best embodiment. However, I desire to have it understood that, within the scope of the appended claims, the invention may be practiced otherwise than as specifically illustrated and described.

I claim:

1. In a railway car brake rigging, the combination with a rod having a bifurcated end that forms a slot for receiving a brake lever, of a brake lever in said slot and pivotally connected intermediate of its ends to the bifurcated end of said rod, said lever having a web and flanges at the edges of the web integral therewith, one of said flanges being positioned beyond the end of said rod and having a depth adjacent to said rod materially greater than the width of the slot therein, the depth of said flange diminishing gradually to the ends of the lever, and the other of said flanges being positioned within said slot and having a depth substantially equal to the width of the slot.

2. In a railway car brake rigging, the combination with a rod having a bifurcated end that forms a slot for receiving a brake lever, of a brake lever in said slot and pivotally connected intermediate of its ends to the bifurcated end of said rod, said lever having a web and flanges at the edges of the web integral therewith, one of said flanges being positioned beyond the end of said rod and having a depth materially greater than the width of said slot, and the other of said flanges being positioned within said slot and having a depth substantially equal to the width of the slot and a width adjacent to the end of said rod materially greater than that of the first-named flange.

3. In a railway car brake rigging, the combination with a rod having a bifurcated end that forms a slot for receiving a brake lever, of a brake lever in said slot and pivotally connected intermediate of its ends to the bifurcated end of said rod, said lever having a web and flanges at the edges of the web integral therewith, one of said flanges being positioned beyond the end of said rod and having a depth adjacent to said rod materially greater than the width of the slot therein, the depth of said flange diminishing gradually to the ends of the lever, and the other of said flanges being positioned within said slot and having a depth substantially equal to the width of the slot and a width adjacent to the end of said rod materially greater than that of the first-named flange.

FREDERIC SCHAEFER.